Patented May 24, 1949

2,471,132

UNITED STATES PATENT OFFICE 2,471,132

METHOD OF PRODUCING A SINTERED ABRASIVE BODY

Axel Charles Wickman, Coventry, England, assignor to A. C. Wickman Limited, Coventry, England, a British company No Drawing. Application March 21, 1947, Serial No. 736,389. In Great Britain April 9, 1946

8 Claims. (Cl. 51—308)

This invention relates to abrasive bodies and relates particularly to bodies of the kind in which diamond particles are incorporated for the grinding or abrading of extremely hard materials. On account of the high cost of diamond particles, it is advantageous to concentrate these particles at the operative surfaces of the body in a bonding material which will hold the particles securely.

It is known to employ resinoid materials and a variety of metals for the bonding of diamond or other abrasive particles, and for many purposes, satisfactory results are achieved by the use of one of these bonding media. However, such bonding media are considerably softer than the materials which are usually ground or abraded by such bonded abrasive bodies, and it is sometimes found that the life of the said bodies is reduced by the wear of the bonding medium, whether of resinoid material or of metal.

It is an object of the invention to provide a diamond abrasive body having a bonding medium or matrix of a hard material showing improved resistance to wear when used for abrading extremely hard materials.

Hard compositions for use as cutting tools are known, which compositions consist of mixtures of alumina and clay with or without fluxing agents, suitably ground and sintered at a high temperature.

In attempting to use such a hard composition, as described, as a matrix for a diamond abrasive body where its mechanical properties would confer hitherto unattained advantages, certain difficulties of a serious character had to be overcome. It was found by experiment, that the process of sintering a moulded product containing the ingredients of the hard composition together with diamond particles, in vacuum, or in a carbon tube furnace with a hydrogen atmosphere, resulted in an unsatisfactory product. Examination of such a product suggests that in the foregoing processes, the diamond particles are very loosely held, and in some cases have been graphitised to the extent of causing porosity of the alumina composition, leaving holes where there should have been diamonds.

According to the present invention, a diamond abrasive body is made of diamond particles bonded by sintering under combined heat and pressure in a bonding medium having a composition consisting substantially of alumina to which has been added silica in the form of a clay, or a compound of alumina and silica, or silica itself, the total amount of silica added being substantially between one and a half and ten per cent by weight of the whole composition of the bonding medium. A flux such as fluorspar, may be added in an amount up to 10 per cent by weight of the whole composition of the bonding medium, such flux serving further to increase the hardness and strength of the said sintered bonding medium.

As an example of the process according to the present invention, the following may be given: A mixture is made of about 93% by weight of finely divided calcined alumina, 4.2% of bentonite (containing about 57.7% of silica), and 2.8% of fluorspar. Distilled water is added and the ingredients are mixed for many hours in a ball mill using balls of hard alumina composition or of one of the usual hard metal compositions, such as tungsten carbide, with an addition of cobalt. If the ingredients are milled with balls of a hard alumina composition, the resulting powder has a composition substantially the same as that of the ingredients put into the ball mill. When, however, tungsten carbide balls containing an addition of cobalt are used, the resulting powder will contain from about 4% up to approximately 12% of a mixture of tungsten carbide and cobalt.

When the grinding is completed, the powder is dried, preferably in a vacuum oven, and, if it is to be granulated before use, the resulting product is then pressed into blocks under a pressure of about ten tons per square inch. The blocks so formed are broken up into granules which will pass through a sieve of 100 meshes per linear inch. The granules so made, or the dried powder (if granulation is not required), are then mixed with diamond particles, and the product is shaped by placing the mixture in a graphite mould whose internal shape corresponds to that of the body to be produced. To bond the mixture with the diamond particles firmly together, it is maintained under pressure in the mould and is sintered as in the known method of hot pressing and sintering other hard materials. Preliminary granulation of the dried powder is mainly a matter of convenience, reducing the volume of material to be filled into the moulds. If the diamond abrasive particles are in the form of a very fine powder, there is little or no advantage in preliminary granulation.

The limits of temperature and pressure suitable for the sintering operation are determined, amongst other factors, by the necessity of avoiding any risk of reaction taking place between the diamond particles and the other ingredients. A pressure of about 100 pounds up to about 2,000 pounds per square inch and a sintering temperature between 1450° and 1700° C., though preferably in the region of 1550° C., have been found suitable.

The alumina-containing powder may be mixed with only such an amount of the diamond particles as is required to form the abrasive faces of the moulded body, the powder alone being used, without the admixture of diamond particles, to form the larger portion of the body. For example, a grinding wheel formed as above described may have the diamond particles concentrated at and near to the operative peripheral surface only.

The hardness of the ingredients of the bonding medium adds materially to the hardness and abrasive resistance of the grinding bodies produced.

An advantage of hot-press sintering of the abrasive mixtures is that there is little or no distortion of the shaped bodies due to the sintering, so that dimensions and tolerances specified can be maintained.

I claim:

1. A method of producing a sintered abrasive body which includes the steps of grinding a wet mixture including alumina and siliceous clay, drying the ground product, forming the dried product into granules, moulding a mixture of the granules with diamond particles, and sintering the moulded product under combined heat and pressure.

2. A method of producing a sintered abrasive body which includes the steps of grinding a wet mixture including alumina and siliceous clay in contact with sintered tungsten carbide with an addition of cobalt, drying the ground product, forming the dried product into granules, moulding a mixture of the granules with diamond particles, and sintering the moulded product under combined heat and pressure.

3. A method of producing a sintered abrasive body as defined in claim 1, wherein the total amount of silica present in the mixture of alumina and siliceous clay is substantially between one and a half to ten per cent by weight of said mixture.

4. A method of producing a sintered abrasive body as defined in claim 1, wherein fluorspar is added to the alumina and siliceous clay to form the bonding medium, the fluorspar being present in an amount up to ten per cent by weight of the said bonding medium.

5. A method of producing a sintered abrasive body which includes the steps of grinding a wet mixture including about 93 per cent by weight of finely divided calcined alumina, about 4.2% by weight of bentonite containing about 57.7% by weight of silica, and about 2.8% by weight of fluorspar; drying the ground product; forming the dried product into granules; moulding the mixture of granules with diamond particles; and sintering the moulded product under combined heat and pressure.

6. A method of producing a sintered abrasive body as defined in claim 1, wherein the temperature to which the moulded product is subjected during the sintering thereof is between 1450° C. and 1700° C.

7. A method of producing a sintered abrasive body as defined in claim 1, wherein the temperature to which the moulded product is subjected during the sintering thereof is about 1550° C.

8. A method of producing a sintered abrasive body as defined in claim 2, wherein the combined amount of tungsten carbide and cobalt present in the wet mixture is between about 4% by weight to about 12% by weight of said mixture.

AXEL CHARLES WICKMAN.

REFERENCES CITED

The following references are of record in the file of this patent:

UNITED STATES PATENTS

| Number | Name | Date |
| --- | --- | --- |
| 2,228,871 | De Bats | Jan. 14, 1941 |
| 2,278,442 | Heany | Apr. 7, 1942 |
| 2,334,266 | Houchins | Nov. 16, 1943 |
| 2,344,024 | Chandler | Mar. 14, 1944 |